US012786139B2

(12) United States Patent
Govindarao et al.

(10) Patent No.: US 12,786,139 B2
(45) Date of Patent: Nov. 3, 2026

(54) TRAFFIC BURST CAPACITY ALLOCATION

(71) Applicant: HEWLETT PACKARD ENTERPRISE DEVELOPMENT LP, Spring, TX (US)

(72) Inventors: Ravikumar Govindarao, Bangalore (IN); Rupak Kumar Sahu, Bangalore (IN); Kranthi Kumar Damarla, Bangalore (IN); Sriharsha Srinivas, Bangalore (IN); Vishwanath Badiger, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 3 days.

(21) Appl. No.: 18/657,504

(22) Filed: May 7, 2024

(65) Prior Publication Data

US 2025/0286830 A1 Sep. 11, 2025

(30) Foreign Application Priority Data

Mar. 6, 2024 (IN) ............................ 202441015955

(51) Int. Cl.

*H04L 47/80* (2022.01)
*H04L 43/067* (2022.01)
*H04L 47/762* (2022.01)

(52) U.S. Cl.

CPC .......... *H04L 47/801* (2013.01); *H04L 43/067* (2013.01); *H04L 47/762* (2013.01)

(58) Field of Classification Search

CPC .... H04L 47/801; H04L 47/762; H04L 43/067
See application file for complete search history.

(56) References Cited

U.S. PATENT DOCUMENTS 6,859,438 B2 * 2/2005 Haddock ................ H04L 47/10 370/429
7,606,154 B1 * 10/2009 Lee ........................ H04L 47/30 370/232
7,788,718 B1 * 8/2010 Fei ...................... H04L 63/1458 726/25

(Continued)

OTHER PUBLICATIONS

Agrawal et al.,"Defense Mechansims Against DDoS Attacks ina Cloud Computing EnviromentL State of the Art and Research Challenges" IEEE Communications Surveys #& Tutorials, vol. 21, Issue 4, Oct. 2019.*

(Continued)

*Primary Examiner* — Todd L Barker
(74) *Attorney, Agent, or Firm* — Hewlett Packard Enterprise Patent Department

(57) ABSTRACT

In some examples, a protection system determines, based on monitoring a traffic volume in a computing environment, a baseline traffic threshold for the computing environment. The protection system allocates, based on a capacity of the protection system and the baseline traffic threshold, a burst threshold to the computing environment for adding a traffic burst capacity. The protection system determines a traffic integrity of data traffic in the computing environment based on a property of the data traffic. Based on the determined traffic integrity in the computing environment, the protection system allows additional traffic in the computing environment beyond the baseline traffic threshold up to the burst threshold.

20 Claims, 5 Drawing Sheets

(56) References Cited

U.S. PATENT DOCUMENTS

| | | | | |
|---|---|---|---|---|
| 9,270,580 | B1 * | 2/2016 | Abraham | H04L 45/28 |
| 10,313,194 | B2 * | 6/2019 | Chuang | H04L 43/18 |
| 2006/0028999 | A1 * | 2/2006 | Iakobashvili | H04L 41/142 370/252 |
| 2015/0334040 | A1 * | 11/2015 | Crowell | G06F 9/45558 709/226 |
| 2019/0044916 | A1 * | 2/2019 | Jones | H04W 12/122 |
| 2020/0167189 | A1 * | 5/2020 | Anand | G06F 9/5038 |
| 2021/0092153 | A1 * | 3/2021 | Wei | H04L 47/29 |
| 2022/0292955 | A1 * | 9/2022 | Takasaki | G08G 1/096775 |
| 2023/0088222 | A1 * | 3/2023 | Tangudu | H04L 12/66 370/230 |
| 2025/0106185 | A1 * | 3/2025 | Ieong | H04L 63/1416 |
| 2025/0133061 | A1 * | 4/2025 | Gubanov | H04L 63/0218 |

OTHER PUBLICATIONS

Hopkins et al., "Applying a Verified Trusted Computing Base to Cyber Protect a Vulnerable Traffic Control Cyber-Physical System", , Mar. 28, 2020.*

Hamdani et al., "Detection of DDOS Attacks in Cloud Computing Environment", May 1, 2019.*

Juniper Engineering, Junos OS, Routing Policies, Firewall Filters, and Traffic Policers User Guide published Dec. 15, 2023 (2303 pages).

Understand Rate Limit Burst Capability downloaded Jan. 17, 2024 (4 pages).

* cited by examiner

TRAFFIC BURST CAPACITY ALLOCATION

BACKGROUND

A firewall system is an example of a protection system that protects computing resources of a computing environment from unauthorized access. The firewall system monitors incoming traffic destined to the computing environment and outgoing traffic sent from the computing environment to determine whether to allow or block the traffic according to one or more security rules.

BRIEF DESCRIPTION OF THE DRAWINGS

Some implementations of the present disclosure are described with respect to the following figures.

Figure 1:
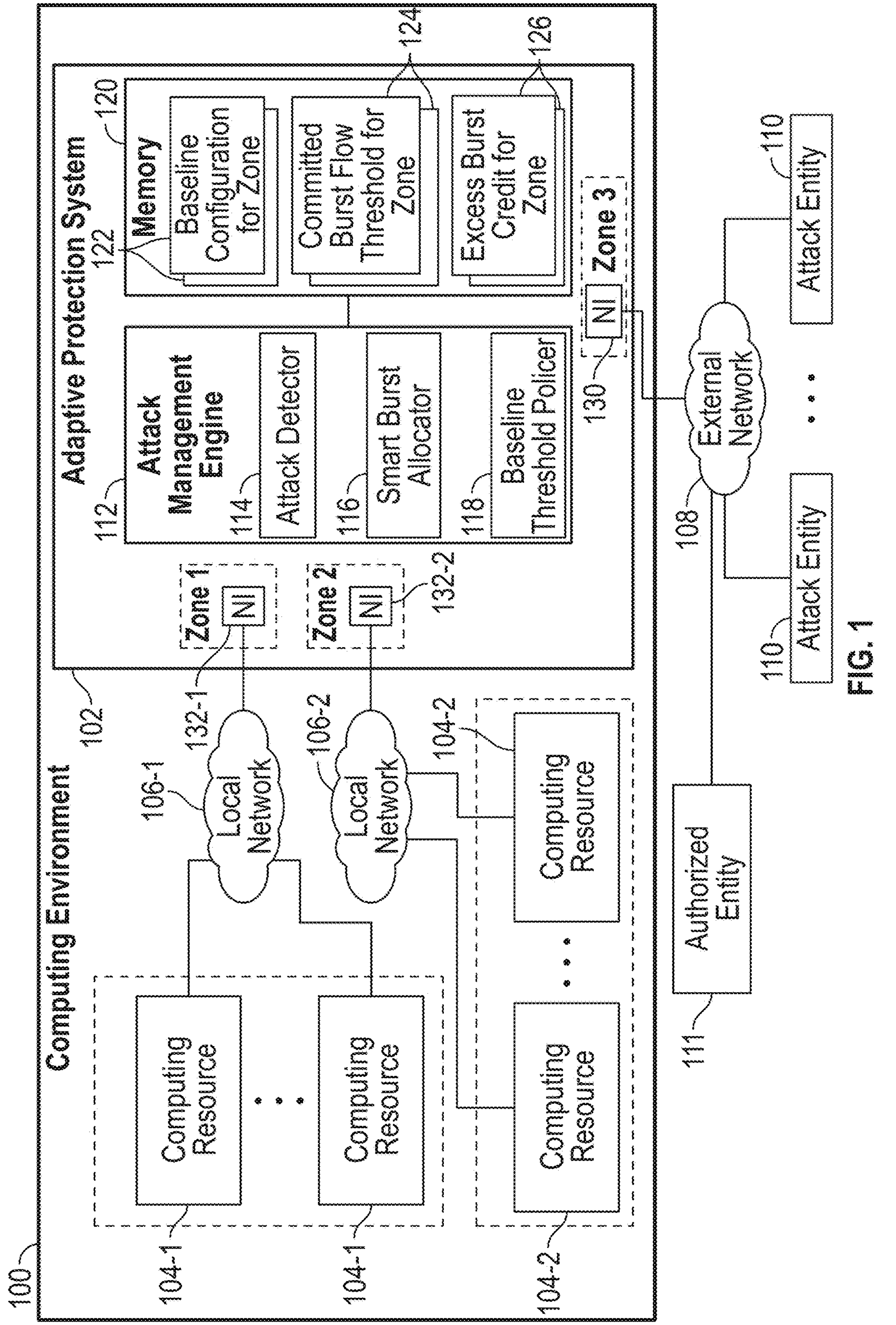
FIG. 1 is a block diagram of an arrangement that includes an adaptive protection system according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A protection system such as a firewall system can be used to protect a computing environment from a denial of service (DoS) attack. The firewall system is expected to defend its own resources as well as computing resources of the computing environment. Computing resources can include machines or programs. A DoS attack involves one or more attack entities sending a high volume of attack traffic to a network of the computing environment, which can cause a capacity of the firewall system to be exceeded such that the firewall system is unable to process genuine traffic, which results in denial of service. "Genuine traffic" refers to traffic that is communicated by authorized entities (machines, and/or programs) that have not been compromised and/or that are not faulty. A DoS attack can cause the firewall system to create traffic flows ("attack traffic flows") as part of processing attack traffic. The attack traffic flows created in response to the attack traffic are in addition to genuine traffic flows of the computing environment. The large quantity of attack traffic flows created by the firewall system can deplete the flow capacity of the firewall system. When the firewall system uses up its flow capacity, denial of service results. When DoS attack traffic is sent concurrently by multiple attack sources, the attack is referred to as a distributed DoS (DDoS) attack.

To protect against a DoS attack, a firewall system can rate limit inbound traffic flows (traffic flows from one or more sources external of the computing environment that is targeted to computing resources in the computing environment) by configuring a traffic threshold in the firewall system. The traffic threshold restricts the quantity of inbound traffic flows to an acceptable level. Any inbound traffic flow that causes the traffic threshold to be exceeded can trigger a response action (e.g., the inbound traffic may be dropped, an alert may be issued, etc.). However, although setting a traffic threshold may be useful to defend against a DoS attack, the traffic threshold may also cause the firewall system to block genuine traffic, such as in instances when there is a surge of genuine traffic. An example of a genuine traffic surge includes an increase in traffic due to an initial launch of a service or product. The blocking of genuine traffic can be disruptive, since users would be unable to access computing resources of a computing environment during periods of high demand.

In accordance with some implementations of the present disclosure, an adaptive protection system can implement a combination of a traffic threshold-based protection against an increased amount of data traffic, a smart burst feature to allow a baseline traffic threshold to be exceeded up to a burst threshold, and an attack detection feature to detect traffic that is part of an attack (e.g., a DoS attack). In some examples of the present disclosure, the adaptive protection system determines, based on monitoring a traffic volume in a computing environment, a baseline traffic threshold for the computing environment, and allocates, based on a capacity of the adaptive protection system and the baseline traffic threshold, a burst threshold to the computing environment. The adaptive protection system determines a traffic integrity of data traffic in the computing environment based on a property of the data traffic. Based on the determined traffic integrity in the computing environment, the adaptive protection system allows additional traffic in the computing environment beyond the baseline traffic threshold up to the burst threshold.

In some examples, a baseline traffic threshold can refer to a baseline flow threshold that sets an upper limit on a quantity of traffic flows allowed by the adaptive protection system. A "traffic flow" can refer to a connection or a session in which data traffic is communicated, where a traffic flow is defined by a collection of properties. A traffic flow can refer to an inbound traffic flow from an external entity (that is outside of the computing environment) to a computing resource in the computing environment, or an outbound traffic flow from a computing resource in the computing environment to a target entity outside the computing environment. Both inbound and outbound traffic flows can pass through the adaptive protection system.

In some examples, a traffic flow can include a TCP/IP (Transmission Control Protocol/Internet Protocol) traffic flow or a UDP/IP (User Datagram Protocol/IP) traffic flow. TCP and UDP are examples of transport protocols that can be used for IP communications over a network. An "IP communication" can refer to a communication in which one or more data packets are routed through a network using IP addresses. For a TCP/IP or UDP/IP flow, each flow is uniquely identified by the following collection of properties: a source IP address, a source port (e.g., a source TCP or UDP port), a protocol (e.g., TCP or UDP), a destination IP address, and a destination port (e.g., a destination TCP or UDP port). The foregoing five properties are referred to as a five-tuple. Another example of a transport protocol is the Internet Control Message Protocol (ICMP), which is used to send error messages and operational information indicating success or failure communications. An ICMP/IP flow can be defined by a different set of properties, including the following: source IP address, a destination IP address, an ICMP type value, and an ICMP Code value. More generally, a traffic flow can be uniquely identified using a collection of properties according to protocols that govern the traffic flow.

FIG. 1 is a block diagram of an example arrangement that includes a computing environment 100 that includes an adaptive protection system 102, such as a firewall system. The adaptive protection system 102 can be implemented using one or more computers.

The computing environment 100 includes computing resources 104 connected to a local network 106. The local network 106 can include a local area network (LAN), which may be a wired network or a wireless network. Examples of the computing resources 104 can include any or some combination of the following: computers (e.g., desktop computers, notebook computers, tablet computers, server computers, etc.), smartphones, game appliances, Internet-of-Things (IoT) devices, storage systems, communication nodes, or other electronic devices. The computing resources 104 can also include programs (machine-readable instructions), data repositories, or other resources.

The computing environment 100 is also coupled over an external network 108 to external entities (machines or programs) that are external of the computing environment 100. The external network 108 may include a wide area network (WAN), which may be a wired or wireless network.

In the example of FIG. 1, entities connected to the external network 108 may include attack entities 110. The external network 108 can also be connected to other entities, including one or more authorized entities 111, which can include web servers, file servers, user devices, and so forth. An "attack entity" refers to an entity that sends attack traffic to a computing environment, for the purpose of overwhelming resources of the computing environment such that the target computing environment would no longer be able to support target operations of the computing environment. Attack traffic flows sent by one or more attack entities 110 are intended to overwhelm the computing resources 104, the local network 106, and the resources of the adaptive protection system 102 to cause denial of service. Attack traffic sent by multiple attack entities distributed across different locations is part of a DDoS attack.

Although FIG. 1 shows an example in which the attack entities 110 are outside of the computing environment 100, in other examples, some attack entities may be present within the computing environment 100 (e.g., such attack entities may be connected to the local network 106).

Attack traffic sent by an attack entity 110 causes the adaptive protection system 102 to create a traffic flow. A traffic flow responsive to traffic from an attack entity is referred to as an "attack traffic flow." An authorized entity 111 sends genuine traffic, which can also cause the adaptive protection system 102 to create a traffic flow (a "genuine traffic flow").

The adaptive protection system 102 includes an attack management engine 112 that is able to protect against a DoS attack. As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

The attack management engine 112 includes an attack detector 114, a smart burst allocator 116, and a baseline threshold policer 118. Each of the attack detector 114, smart burst allocator 116, and a baseline threshold policer 118 can be implemented using a portion of the hardware processing circuitry of the attack management engine 112, or as machine-readable instructions executable by a processing resource of the attack management engine 112.

In some examples, the adaptive protection system 102 is a zone-based adaptive protection system that manages traffic flows for respective different zones of the computing environment 100. FIG. 1 shows an example including zones 1, 2, and 3 in the computing environment 100. Zone 1 includes a network interface (NI) 132-1 to communicate over a local network 106-1 with computing resources 104-1, and zone 2 includes a network interface 132-2 to communicate over a local network 106-2 with computing resources 104-2. A network interface can include a signal transceiver to transmit and receive signals, as well as protocol layers that manage the communication of data according to respective communication protocols over the network.

In other examples, there may be more than three zones. A "zone" of the computing environment can refer to a partition of the computing environment 100, where the partition includes a subset of the computing resources in the computing environment 100. Thus, a first zone can include a first subset of the computing resources (104-1), a second zone can include a second subset of the computing resources (104-2), and so forth. Different zones may implement different security policies that can be suited to respective risk postures of the corresponding zones.

Examples of zones can include an enterprise zone and a guest zone. The enterprise zone can include computing resources that are owned by or operated by an enterprise or by authorized users of the enterprise, where an enterprise can refer to an organization (e.g., a company, a government agency, an educational organization, or another organization) or an individual. The guest zone can include computing resources owned by or operated by guest users that are visitors of the enterprise. In other examples, zones can be associated with different departments of the enterprise, such as a zone for users of the human resources department, a zone for users of the research and development department, a zone for the finance department, and so forth. In other examples, other types of zones can be defined.

The adaptive protection system 102 also includes a network interface 130 (or multiple network interfaces) that is connected to the external network 108. The network interface 130 is part of zone 3. The designation of the network interface 130 as being part of zone 3 indicates that the adaptive protection system 102 monitors inbound traffic from the external network 108 that is connected to the network interface 130, for the purpose of enforcing security policies.

Although the present discussion refers to some examples in which the adaptive protection system 102 is used to protect multiple zones of the computing environment 100, in other examples, zone-based protection is not employed. Rather, the adaptive protection system 102 applies its protection for the computing environment 100 as a whole.

The baseline threshold policer 118 can set baseline flow thresholds for respective zones of the computing environment 100. For each zone, one or more baseline thresholds may be configured by the baseline threshold policer 118. Multiple baseline flow thresholds can include a lower baseline flow threshold and a higher baseline flow threshold. The lower baseline flow threshold if exceeded by a quantity of traffic flows established for a respective zone indicates that a potential threat is building up for the respective zone. The higher baseline flow threshold if exceeded indicates that a threat has occurred for the respective zone.

More generally, for each zone, a baseline configuration 122 set by the baseline threshold policer 118 can include one or more baseline flow thresholds and information of the response actions to take if the one or more baseline flow thresholds are exceeded. In addition to specifying baseline flow threshold(s) and responsive action(s) to take if the baseline flow threshold(s) for the zone is exceeded, the baseline configuration 122 for the zone can also specify a classification of the traffic subject to measurement. For example, a source-based classification specifies that traffic from a source is monitored and subject to a responsive action. As another example, a destination-based classification specifies that traffic to a destination (e.g., a destination IP address or other network address) is monitored and subject to a responsive action.

As examples, the baseline configuration 122 for a zone can specify that if the lower baseline flow threshold is exceeded, the baseline threshold policer 118 can trigger a logging event in which information indicating that the lower baseline threshold has been exceeded and a classification of the traffic is added to a log, which can be stored in the memory 120 of the adaptive protection system 102. As another example, the baseline configuration 122 for the zone can specify that if the higher baseline flow threshold is exceeded, the baseline threshold policer 118 can drop any further traffic from a source or targeted to a destination that caused the higher baseline flow threshold to be exceeded. Alternatively, an IP address (or other network address) of the source may be added to a prohibited list, so that any traffic from an entity identified in the prohibited list would be blocked at the adaptive protection system 102. Dropping traffic from a source can mean that a new traffic flow would not be created in response to traffic from the source, and further, that a request for new traffic is dropped by the adaptive protection system 102 without forwarding the request.

The baseline configuration 122 for the zone can also specify a metric to be measured. In examples given above, the metric is the quantity of flows of traffic. In other examples, the metric specified by the baseline configuration 122 can be a different metric, such as a rate of traffic, a quantity of embryonic flows (unidirectional flows), and so forth. For such other metrics, a baseline threshold of the baseline configuration 122 can be a threshold representing a limit on the rate of traffic, a threshold representing a limit on the quantity of embryonic flows, and so forth.

The baseline configuration 122 for each zone can be stored in a memory 120. The memory 120 can be implemented using one or more memory devices, such as dynamic random access memory (DRAM) devices, static random access memory (SRAM) devices, flash memory devices, and so forth. In some cases, the memory 120 is a persistent memory that maintains its stored content even if power is removed from the memory.

Baseline and Burst Computations

Figure 2:
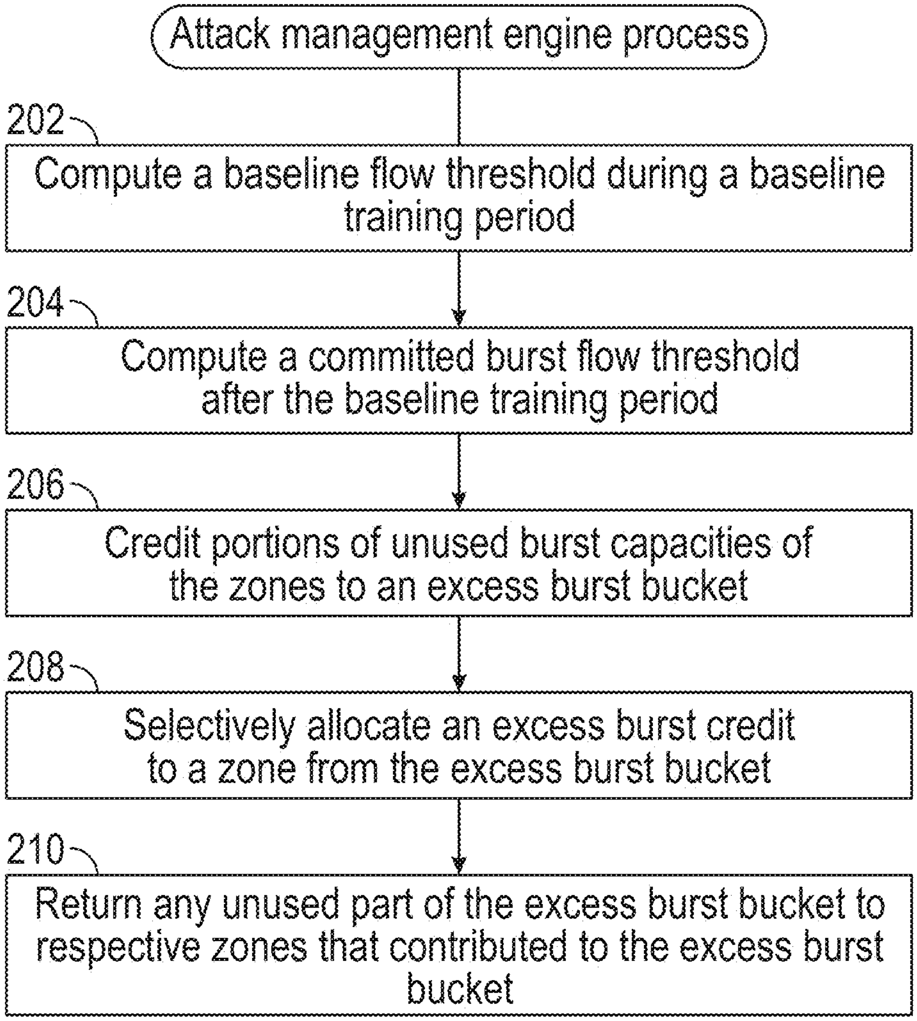
FIG. 2 is a flow diagram of a process of an attack management engine, according to some examples.

The following refers to both FIG. 1 and FIG. 2. FIG. 2 is a flow diagram of a process of the attack management engine 112, according to some examples of the present disclosure.

The baseline threshold policer 118 can compute (at 202) a baseline flow threshold during a baseline training period in which the baseline threshold policer 118 monitors traffic flows and derives the baseline flow threshold based on the monitored traffic flows. The baseline training period is initiated when adaptive protection is first activated in the adaptive protection system. The baseline training period can last a certain length of time, such as 14 days or a different length of time. Generally, during the baseline training period, peak concurrent flows are measured for the zones of the computing environment 100. The baseline threshold policer 118 computes the baseline flow threshold for a zone based on the peak concurrent flows in the zone. A discussion of "peak concurrent flows" and baseline flow threshold computations is provided further below. After the baseline training period, the baseline threshold policer 118 can update the baseline flow threshold at specified baseline calculation intervals, which can be shorter than the baseline training period. In each baseline calculation interval, new measurements of peak concurrent flows are acquired and the corresponding baseline flow threshold is updated.

While the baseline threshold policer 118 is able to provide protection against DoS attacks using baseline thresholds, the baseline threshold policer 118 may also block genuine traffic, particularly during periods when there is a surge in genuine traffic that may cause baseline thresholds set by the baseline threshold policer 118 to be exceeded. Such blocking of genuine traffic is disruptive to operations of the computing environment 100.

In some examples, to reduce the likelihood of denial of service, the adaptive protection system can allow for establishment of additional traffic flows for a zone even if the quantity of traffic flows exceeds a baseline flow threshold of the zone. The additional traffic flows established after the baseline flow threshold has been exceeded are referred to as burst traffic flows. The smart burst allocator 116 that is part of the attack management engine 112 can allow for the establishment of burst traffic flows up to a "committed" burst flow threshold for the zone.

More generally, the smart burst allocator 116 allows for a surge in genuine traffic that exceeds a baseline threshold. The smart burst allocator 116 can work in conjunction with the attack detector 114 that is used for detecting whether an attack is occurring.

A "committed" burst flow threshold for each zone can be computed (at 204) after the baseline training period by the smart burst allocator 116 using a flow capacity (Flow_Capacity) of the adaptive protection system 102 and a flow utilization (Flow_Utilization) of the adaptive protection system 102. The committed burst flow threshold represents a pre-computed upper limit on the quantity of burst traffic flows that the smart burst allocator 116 can allow for a zone. Committed burst flow thresholds 124 computed by the smart burst allocator 116 are stored in the memory 120. The committed burst flow threshold for one zone may be the same as or different from the committed burst flow threshold for another zone.

Note that burst traffic flows allowed up to the committed burst flow threshold 124 for any given zone are traffic flows that include genuine traffic ("genuine traffic flows"). A genuine traffic flow includes traffic that has not been indicated by the attack detector 114 as likely containing attack traffic. A discussion of the attack detector 114 is provided further below.

For each zone, the attack management engine 112 can allow a quantity of traffic flows up to a baseline flow threshold for the zone. Note that the quantity of traffic flows up to the baseline flow threshold for the zone may possibly include both genuine and attack traffic flows. Once the baseline flow threshold for the zone is exceeded, the attack management engine 112 can allow an additional burst traffic flows (that include genuine traffic but not attack traffic) up to the committed burst flow threshold 124 for the zone.

The flow capacity (Flow_Capacity) of the adaptive protection system 102 refers to the maximum quantity of concurrent traffic flows that can be established by the adaptive protection system 102. "Concurrent traffic flows" refers to traffic flows there are active at the same time. Each traffic flow consumes resources of the adaptive protection system 102. The adaptive protection system 102 has a flow capacity that is based on the resources (e.g., processing resources, storage resources, communication resources, and/or other resources) available in the adaptive protection system. If the quantity of concurrent flows established by the adaptive protection system 102 reaches the flow capacity of the adaptive protection system 102, then no further traffic flows can be established by the adaptive protection system 102.

To compute the committed burst flow thresholds 124 for the zones of the computing environment 100, the smart burst allocator 116 computes a flow reserve capacity (Flow_Reserve) of the adaptive protection system 102 according to Eq. 1 below.

$$\text{Flow\_Reserve} = \text{Flow\_Capacity} - \text{Flow\_Utilization}. \quad \text{(Eq. 1)}$$

The flow utilization (Flow_Utilization) of the adaptive protection system 102 is computed according to Eq. 2 below.

$$\text{Flow\_Utilization} = \sum_{i=1}^{n} \text{Zone\_baseline}_i, \quad \text{(Eq. 2)}$$

$$n = \text{total number of zones.}$$

The parameter $\text{Zone\_baseline}_i$ represents the baseline flow threshold for zone i, where i=1 to n. The flow utilization (Flow_Utilization) is the sum (or another aggregate) of the baseline flow thresholds across all zones protected by the adaptive protection system 102. The flow utilization represents the quantity of traffic flows that would be established by the adaptive protection system assuming the number of traffic flows for each zone is the maximum allowed by the baseline threshold policer 118 according to the baseline flow threshold of the zone.

The flow reserve (Flow_Reserve) computed according to Eq. 1 represents the reserve capacity available at the adaptive protection system 102 assuming that the number of traffic flows for each zone is the maximum allowed by the baseline threshold policer 118 according to the baseline flow threshold of the zone.

In some examples, the smart burst allocator 116 splits the flow reserve (Flow_Reserve) among the zones in proportion to the zones' baseline flow thresholds in computing the committed burst flow thresholds 124 for the respective zones. More specifically, the smart burst allocator 116 computes the committed burst flow threshold ($Bc_i$) for zone i according to Eq. 3 below.

$$Bc_i = \frac{\text{Zone\_baseline}_i}{\text{Flow\_Utilization}} \cdot \text{Flow\_Reserve}. \quad \text{(Eq. 3)}$$

In the event that Flow_Reserve is less than a threshold (e.g., less than 10% or other percentage of the flow capacity, the smart burst feature is disabled by the smart burst allocator 116 since there may not be sufficient spare capacity available to support bursting.

The flow reserve (Flow_Reserve) is equal to the sum of the allocated committed burst flow thresholds, as represented by Eq. 4 below.

$$\text{Flow\_Reserve} = \sum_{i=1}^{n} Bc_i. \quad \text{(Eq. 4)}$$

Although a committed burst flow threshold ($Bc_i$) is allocated to each zone i, a portion of the burst capacity represented by the committed burst flow threshold ($Bc_i$) may be unused. For example, if the committed burst flow threshold ($Bc_i$) indicates a burst capacity of 10,000 burst traffic flows over the baseline flow threshold ($\text{Zone\_baseline}_i$) for zone i, but just 6,000 additional burst traffic flows have been created for zone i, then the unused burst capacity ($\text{Bc\_unused}_i$) of zone i is 4,000 burst traffic flows. Note that $\text{Bc\_unused}_i$ for any zone i may be zero or greater than zero.

The smart burst allocator 116 can credit (at 206) portions of unused burst capacities of the zones to an excess burst bucket (Bucket_excess). In some examples, the smart burst allocator 116 credits a portion of the unused burst capacity ($\text{Bc\_unused}_i$) of zone i to the excess burst bucket (Bucket_excess) in response to determining that zone i is experiencing traffic less than the baseline flow threshold $\text{Zone\_baseline}_i$ for zone i. If the traffic in zone i exceeds the baseline flow threshold $\text{Zone\_baseline}_i$ for zone i, then the smart burst allocator 116 disables the crediting of the unused burst ($\text{Bc\_unused}_i$) to the excess burst bucket (Bucket_excess), in anticipation of the possibility that the unused burst capacity would have to be used for further traffic of the zone.

A portion of the unused burst capacity ($\text{Bc\_unused}_i$) of zone i that is credited to Bucket_excess is represented as $\text{Bc\_credited}_i$. Whereas $\text{Bc\_unused}_i$ represents the total unused burst capacity of zone i, $\text{Bc\_credited}_i$ represents the portion (e.g., a fraction) of $\text{Bc\_unused}_i$ that is credited to Bucket_excess. In other words, the unused burst capacity portion $\text{Bc\_credited}_i$ of zone i that is credited to Bucket_excess may not be the entirety of the unused burst capacity ($\text{Bc\_unused}_i$) of zone i. In the foregoing example in which it is assumed that the unused burst capacity of zone i is 4,000 burst traffic flows, just a subset (represented as $\text{Bc\_credited}_i$) less than the entirety of the 4,000 burst traffic flows may be credited to Bucket_excess.

Crediting $\text{Bc\_credited}_i$ to the excess burst bucket (Bucket_excess) refers to adding $\text{Bc\_credited}_i$ to Bucket_excess. When $\text{Bc\_credited}_i$ for zone i is credited to Bucket_excess, the unused burst capacity ($\text{Bc\_unused}_i$) of zone i is reduced by the amount credited ($\text{Bc\_credited}_i$), according to Eq. 5 below.

$$\text{Bc\_unused}_i = \text{Bc\_unused}_i - \text{Bc\_credited}_i. \quad \text{(Eq. 5)}$$

At specified time points (e.g., at periodic time points) or in response to other events, the smart burst allocator 116 can determine the unused burst capacity of each zone and credit $\text{Bc\_credited}_i$ to a current excess burst bucket (Bucket_excess (t)), where t represents a current time instant, according to Eq. 6 below.

$$\text{Bucket\_excess}(t) = \text{Bucket\_excess}(t-1) + \sum_{i=1}^{n} \text{Bc\_credited}_i. \quad \text{(Eq. 6)}$$

In Eq. 6, Bucket_excess(t−1) is the excess burst bucket at a prior time instant. Although not indicated in Eq. 6, note that $Bc\_credited_i$ is also a function of time (i.e., $Bc\_credited_i$ can vary over time). The other parameters computed according to Eqs. 1-5 are also functions of time.

If $Bc\_unused_i$ is zero for any zone i (which means the zone has no unused burst capacity), then $Bc\_credited_i$ would be zero. Note that the smart burst allocator 116 may be configured to not credit unused burst capacities of selected zones to Bucket_excess(t). For example, if a particular zone includes computing resources deemed to perform relatively important operations of an enterprise, the smart burst allocator 116 may elect not to credit any unused burst capacity of the particular zone to Bucket_excess(t). The smart burst allocator 116 may simply set $Bc\_credited_i$ to zero for this particular zone.

In a specific example, the smart burst allocator 116 can incrementally credit portions of the unused burst capacity ($Bc\_unused_i$) of zone i to Bucket_excess(t). For example, over an excess burst credit period of a specified length, the smart burst allocator 116 can break the excess burst credit period into multiple time points. At each time point of the excess burst credit period, the smart burst allocator 116 can add a fraction of the unused burst capacity ($Bc\_unused_i$) as $Bc\_credited_i$ to Bucket_excess(t).

In an example, it is assumed that the excess burst credit period is 30 time units (e.g., seconds). In other examples, a different time length may be used as the excess burst credit period. The smart burst allocator 116 can break the excess burst credit period into 30 time points. The unused burst capacity determined at the beginning of the excess burst credit period is $Bc\_unused\_starting_i$. During the excess burst credit period, the smart burst allocator 116 can add 1/30 of the starting unused burst capacity $Bc\_unused\_starting_i$ every time unit to the excess burst bucket (Bucket_excess(t)). In other words, within the 30-time unit excess burst credit period, the smart burst allocator 116 adds, at time unit T1, 1/30 of $Bc\_unused\_starting_i$ to Bucket_excess(t); the smart burst allocator 116 adds, at time unit T2, another 1/30 of $Bc\_unused\_starting_i$ to Bucket_excess(t); and so forth until, at time unit T30, the smart burst allocator 116 adds the last 1/30 of $Bc\_unused\_starting_i$ to Bucket_excess(t). In this example, the 1/30 of $Bc\_unused\_starting_i$ added to Bucket_excess(t) at every time unit is $Bc\_credited_i$.

In other examples, a different way of deriving $Bc\_credited_i$ from $Bc\_unused_i$ can be used by the smart burst allocator 116.

The excess burst bucket (Bucket_excess(t)) represents a global pool of excess burst capacity of the adaptive protection system 102 from which excess burst capacity may be selectively allocated to one or more zones, while not allocated to one or more other zones. The committed burst flow threshold ($Bc_i$) for zone i is distinguished from an excess burst credit ($Be_i$) that may be allocated to zone i. The smart burst allocator 116 selectively allocates (at 208) an excess burst credit ($Be_i$) to zone i from the excess burst bucket (Bucket_excess(t)). In some examples, that the excess burst credit ($Be_i$) allocated to zone i from the excess burst bucket (Bucket_excess(t)) may be different (less than or greater than) the unused burst capacity ($Bc\_unused_i$) of zone i allocated to the excess burst bucket (Bucket_excess(t)).

If a zone is allocated the excess burst credit by the smart burst allocator 116, then further burst traffic flows (containing genuine traffic) over the committed burst flow threshold 124 for the zone may be allowed, up to a quantity based on the excess burst credit. Some zones may be allocated an excess burst credit, while other zones may not be allocated an excess burst credit. For example, a zone that includes computing resources deemed to perform relatively important operations of an enterprise may be allocated an excess burst credit, while another zone that includes computing resources deemed to perform less important operations may not be allocated an excess burst credit. Whether or not a zone is allocated an excess burst credit may be configured by an administrator or other entity. Excess burst credits 126 for zones can be stored in the memory 120 (as shown in FIG. 1).

At the end of the excess burst credit period, the smart burst allocator 116 returns (at 210) any unused part of the excess burst bucket (Bucket_excess(t)) to respective zones that contributed to the excess burst bucket (Bucket_excess(t)). The unused part of the excess burst bucket (Bucket_excess(t)) is referred to as the unused excess burst bucket (Bucket_excess_unused).

The return of a part of the unused excess burst bucket (Bucket_excess_unused) to zone i refers to adding the returned part of the unused excess burst bucket (Bucket_excess_unused) to the unused burst capacity $Bc\_unused_i$ of zone i. The portions of the unused excess burst bucket (Bucket_excess_unused) returned to respective zones are in proportion to the contributions of credits of portions of unused burst capacities of the zones to the excess burst bucket (Bucket_excess(t)). In other words, if zone 1 contributed more unused burst capacity to Bucket_excess(t) than zone 2, then the smart burst allocator 116 would return proportionately more of the unused excess burst bucket (Bucket_excess_unused) to zone 1 than to zone 2.

Token-Based Management of Incoming Traffic

Figure 3:
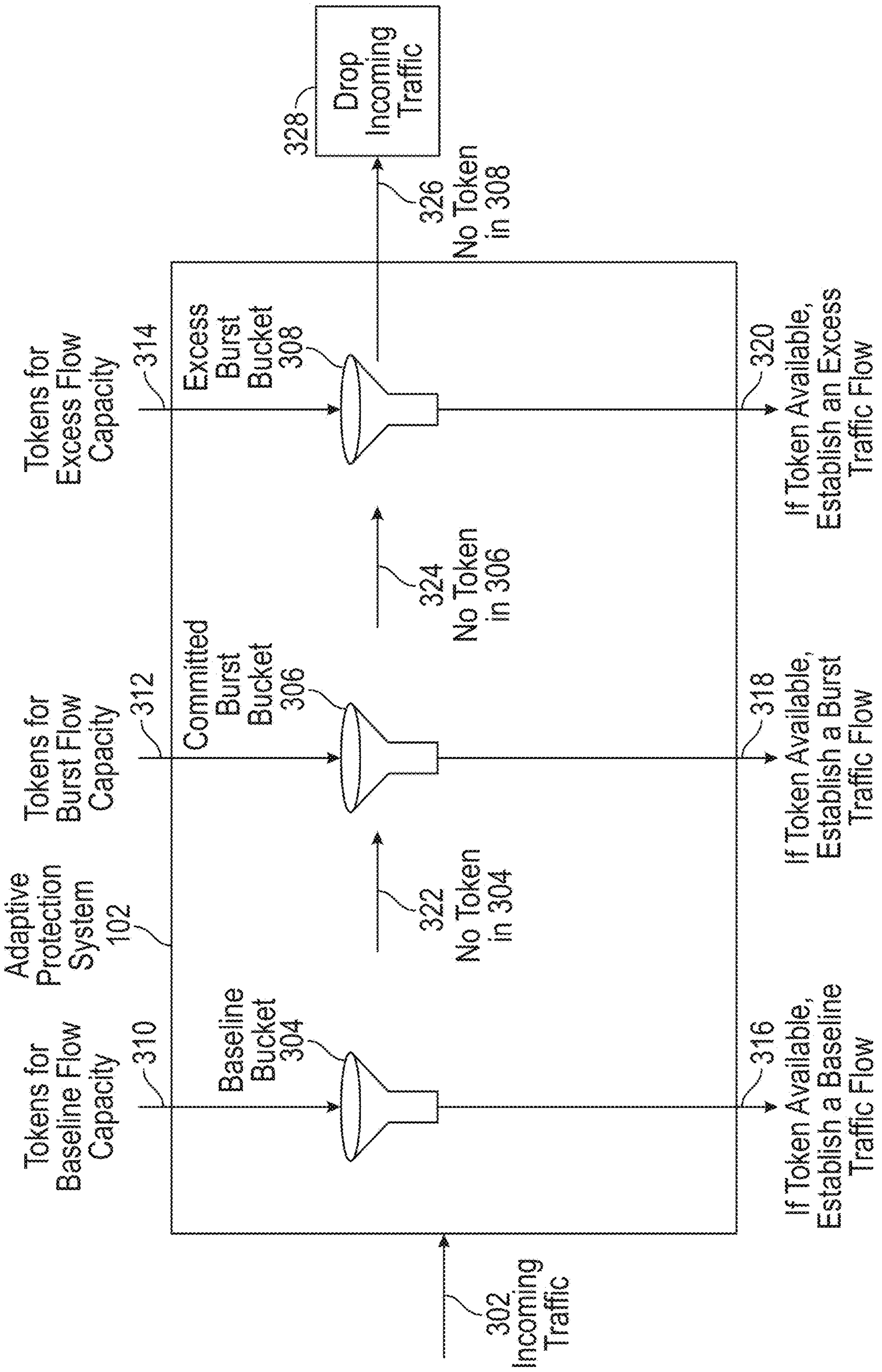
FIG. 3 is a block diagram of a token-based protection system according to some examples.

FIG. 3 is a block diagram of a token-based management of incoming traffic 302 as performed by the adaptive protection system 102 for zone i. A "token" can represent an indication of capacity to establish a traffic flow (or multiple traffic flows). Three buckets 304, 306, and 308 are depicted in FIG. 3, and each bucket is associated with a respective number of tokens. The bucket 304 is a baseline bucket that includes a first collection of tokens representing the baseline flow capacity to establish traffic flows up to a respective baseline flow threshold ($Zone\_baseline_i$) for zone i. The bucket 306 is a committed burst bucket that includes a second collection of tokens representing the burst flow capacity to establish traffic flows up to a committed burst flow threshold ($Bc_i$) for zone i. The bucket 308 is an excess burst bucket that includes a third collection of tokens representing the excess burst capacity to establish traffic flows up to an excess burst credit ($Be_i$).

The first collection of tokens is added (at 310) to the baseline bucket 304 in a baseline training period or baseline calculation interval by the baseline threshold policer 118. The quantity of tokens in the first collection of tokens is based on the baseline flow threshold ($Zone\_baseline_i$) computed by the baseline threshold policer 118. For example, if the baseline flow threshold ($Zone\_baseline_i$) is 5,000 traffic flows, then 5,000 tokens may be included in the first collection of tokens to represent the capacity to establish up to 5,000 traffic flows. In other examples, one token may represent more than one traffic flow. As a traffic flow is established by the baseline threshold policer 118 up to the baseline flow threshold ($Zone\_baseline_i$), a token is deducted from the baseline bucket 304.

The second collection of tokens is added (at 312) to the committed burst bucket 304 in a baseline calculation interval by the smart burst allocator 116 based on the committed burst flow threshold ($Bc_i$) computed according to Eq. 3. The quantity of tokens in the second collection of tokens is based on the committed burst flow threshold ($Bc_i$) computed by the smart burst allocator 116. As a traffic flow is established by the smart burst allocator 116 up to the committed burst flow threshold ($Bc_i$), a token is deducted from the committed burst bucket 306.

The third collection of tokens is added (at 314) to the excess burst bucket 308 during the excess burst credit period based on the excess burst credit ($Be_i$). The quantity of tokens in the third collection of tokens is based on the excess burst credit ($Be_i$) computed by the smart burst allocator 116. As a traffic flow is established by the smart burst allocator 116 up to the excess burst credit ($Be_i$), a token is deducted from the excess burst bucket 308.

In response to the incoming traffic 302, the baseline threshold policer 118 determines whether any token in the first collection of tokens is available in the baseline bucket 304. If there is at least one token available in the baseline bucket 304, the baseline threshold policer 118 can establish (at 316) a baseline traffic flow for the incoming traffic 302. On the other hand, if a quantity of traffic flows has been established up to the baseline flow threshold ($Zone\_baseline_i$) in zone i, then no tokens would remain in the baseline bucket 304, and the baseline threshold policer 118 would no longer be able to establish another traffic flow for the incoming traffic 302.

If no token remains in the baseline bucket 304 (as indicated by arrow 322), the smart burst allocator 116 determines whether any token in the second collection of tokens is available in the committed burst bucket 306. If there is at least one token available in the committed burst bucket 306, the smart burst allocator 116 can establish (at 318) a burst traffic flow for the incoming traffic 302. In accordance with some implementations of the present disclosure, prior to establishing the burst traffic flow, the smart burst allocator 116 makes a determination of whether traffic communicated in zone i contains attack traffic. In some examples, the attack detector 114 can measure the integrity of a traffic sample to determine whether the incoming traffic 302 contains attack traffic. As discussed further below, the traffic sample can include traffic collected during an integrity sampling interval.

The smart burst allocator 116 can use an output of the attack detector 114 to determine whether the traffic sample collected in the most recent integrity sampling interval contains attack traffic. If the smart burst allocator 116 determines, based on the output of the attack detector 114, that the traffic sample collected in the most recent integrity sampling interval contains attack traffic, then the smart burst allocator 116 does not allow a burst traffic flow to be established for the incoming traffic 302. However, if the smart burst allocator 116 determines, based on the output of the attack detector 114, that the traffic sample collected in the most recent integrity sampling interval does not contain attack traffic, then the smart burst allocator 116 allows the burst traffic flow to be established for the incoming traffic 302.

If a quantity of burst traffic flows has been established up to the committed burst flow threshold ($Bc_i$) in zone i, then no tokens would remain in the committed burst bucket 306, and the smart burst allocator 116 would no longer be able to establish another burst traffic flow for the incoming traffic 302.

If no token remains in the committed burst bucket 306 (as indicated by arrow 324), the smart burst allocator 116 determines whether any token in the third collection of tokens is available in the excess burst bucket 308. If there is at least one token available in the committed burst bucket 306, the smart burst allocator 116 can establish an excess burst traffic flow for the incoming traffic 302. The "excess burst traffic flow" is established after the committed burst flow threshold ($Bc_i$) has been exceeded.

In accordance with some implementations of the present disclosure, prior to establishing the excess burst traffic flow, the smart burst allocator 116 makes a determination, based on an output of the attack detector 114, of whether traffic communicated in zone i contains attack traffic. If the smart burst allocator 116 determines, based on the output of the attack detector 114, that the traffic sample collected in the most recent integrity sampling interval contains attack traffic, then the smart burst allocator 116 does not allow an excess burst traffic flow to be established for the incoming traffic 302. However, if the smart burst allocator 116 determines, based on the output of the attack detector 114, that the traffic sample collected in the most recent integrity sampling interval does not contain attack traffic, then the smart burst allocator 116 allows the excess burst traffic flow to be established for the incoming traffic 302.

If a quantity of excess burst traffic flows has been established up to the excess burst credit ($Be_i$) in zone i (or if no excess burst credit was allocated to zone i), then no tokens would remain in the excess burst bucket 308 (as indicated by arrow 326), and the smart burst allocator 116 would not establish another excess burst traffic flow for the incoming traffic 302. Instead, the adaptive protection system 102 would drop (at 328) the incoming traffic 302.

By providing burst traffic capacity using the committed burst bucket 306 and possibly the excess burst bucket 308, the incoming traffic 302 is not dropped simply because the baseline flow threshold ($Zone\_baseline_i$) in zone i is exceeded. Rather, additional burst capacity is provided so that genuine traffic can flow without disruption.

In some examples, the adaptive protection system 102 can differentiate treatment of traffic flows depending on which of the buckets 304, 306, and 308 the traffic flows were established under. If a first traffic flow is established using a token from the baseline bucket 304, the adaptive protection system 102 marks the first traffic flow as a first category of traffic. If a second traffic flow is established using a token from the committed burst bucket 306, the adaptive protection system 102 marks the second traffic flow as a second category of traffic. If a third traffic flow is established using a token from the excess burst bucket 308, the adaptive protection system 102 marks the third traffic flow as a third category of traffic.

In some examples, the differentiated treatment for different categories of traffic can include setting different TCP inactivity timeouts. A TCP inactivity timer counts a length of time that a TCP connection can remain idle (i.e., no traffic is communicated) and still remain active. If the TCP inactivity timer expires after a period of inactivity during which traffic is not communicated in the TCP connection, an electronic device can consider the TCP connection as no longer active and will not communicate traffic through the TCP connection. In some examples, the TCP inactivity timeout period for a burst traffic flow or an excess burst traffic flow can be smaller than the TCP inactivity timeout period for a traffic flow established by the baseline threshold policer 118.

Attack Detection

As noted above, before establishing a burst traffic flow or an excess burst traffic flow, the smart burst allocator 116 checks to determine whether an incoming traffic includes attack traffic. Although bursting genuine traffic has benefits in allowing the computing environment 100 to handle surges in the genuine traffic, bursting attack traffic would do more harm than good, since bursting attack traffic may amplify a DoS attack that can lead to denial of service.

As noted above, the attack detector 114 is used to detect whether an incoming traffic includes attack traffic. The ability to detect attack traffic allows the smart burst allocator 116 to avoid bursting the attack traffic. Moreover, the baseline threshold policer 118 does not consider attack traffic flows in computing baseline flow thresholds. Also, the baseline threshold policer 118 does not use measurements in a zone in which attack traffic is communicated when computing baseline flow thresholds for the zone.

The attack detector 114 measures the integrity of traffic using Indicators of Compromise (IoC) signals. An "IoC signal" can represent any property that provides an indication of whether traffic in a zone is genuine traffic or attack traffic. The attack detector 114 can measure the integrity of a traffic sample of a zone, such as traffic collected in the zone during an integrity sampling interval. The integrity sampling interval can be a sampling interval during the baseline training period or after the baseline training period.

The attack detector 114 classifies the traffic sample as high integrity or low integrity. A low integrity traffic sample is considered to include attack traffic. In other examples, the attack detector 114 can assign a value (from multiple possible values) to the traffic sample. If the assigned value is less than or greater than a specified threshold, then the traffic sample can be considered to include attack traffic.

In each integrity sampling interval for a given zone, if at least a specified percentage (e.g., 25% or another percentage) of traffic in the traffic sample of the given zone is detected to have low integrity, then the entirety of the traffic sample is considered to have low integrity. Low integrity samples are not considered for baseline flow threshold computation by the baseline threshold policer 118 for the given zone. This prevents inflated baseline flow thresholds due to attack traffic being present in the given zone.

The smart burst allocator 116 allows the creation of a burst traffic flow or an excess burst traffic flow responsive to a determination that a traffic sample collected in the most recent integrity sampling interval has high integrity.

Examples of IoC signals are discussed below. An IoC signal can include an embryonic traffic flow (or one-way traffic flow) property, which indicates whether a traffic flow is a one-way flow. If a large quantity (greater than an integrity threshold) of traffic flows are one-way flows (rather than two-way flows in which bidirectional exchanges of information are performed), that can be an indication of attack traffic. An "integrity threshold" refers to a threshold (which can be predefined by an administrator, a machine, or a program) that defines a point at which an IoC signal would likely indicate an anomaly possibly associated with attack traffic.

An IoC signal can include error indication property, which represents errors indicated in Internet Control Message Protocol (ICMP) error messages. ICMP is a protocol used to communicate problems with data transmissions. A large quantity (greater than an integrity threshold) of errors can indicate presence of attack traffic.

An IoC signal can include a firewall drop count property, which indicates a count of dropped data packets. A large firewall drop count (greater than an integrity threshold) can indicate presence of attack traffic.

An IoC signal can include an alert property associated with an intrusion detection system or an intrusion protection system. A large quantity (greater than an integrity threshold) of such alerts can indicate presence of attack traffic.

An IoC signal can include a host or port scan property, which indicates that an entity outside a computing environment is attempting to scan resources in the computing environment. A large quantity (greater than an integrity threshold) of such scans can indicate presence of attack traffic.

An IoC signal can include a reputation property of an IP address, whether internal or external to a computing environment. The reputation of an IP address may be updated by an IP reputation tool that tracks any suspicious activities associated with an IP address. A large quantity (greater than an integrity threshold) of traffic flows associated with IP addresses of relatively low reputation may indicate presence of attack traffic.

The attack detector 114 considers one or more of the IoC signals in determining whether a traffic sample contains attack traffic. If multiple IoC signals are considered, then the attack detector 114 can derive a value based on a weighted aggregate of the multiple IoC signals. Some IoC signals may have greater weight than other IoC signals.

The attack detector 114 may determine, based on the IoC signals, that a traffic sample has high integrity at a first time, at which point the smart burst allocator 116 can allow additional burst traffic beyond a baseline traffic threshold. However, at a later time, the attack detector 114 may determine, based on the IoC signals, that a traffic sample has a low integrity. Responsive to determining that a traffic sample has a low integrity at the second time, the smart burst allocator 116 can prevent additional burst traffic in the computing environment beyond the baseline traffic threshold.

Baseline Threshold Computations

The following describes an example of how the baseline threshold policer 118 computes baseline flow thresholds. The baseline threshold policer 118 measures, for each zone, a measure of peak concurrent flows in baseline calculation intervals. A baseline calculation interval may be a five-minute interval (or interval of another time length), while the baseline training period may have a longer time length and may be defined to cover periods of increased traffic activity and reduced traffic activity (e.g., week day versus weekend, off-peak vs peak time periods, etc.).

A measure of peak concurrent flows can represent the maximum quantity of traffic flows that are active at the same time during the baseline calculation interval. The measure of peak concurrent flows can be repeatedly measured across multiple baseline calculation intervals of the baseline training period. Over the baseline training period, a collection of measures of peak concurrent flows are acquired over the multiple baseline calculation intervals. The baseline threshold policer 118 can apply a $95^{th}$ percentile on the collection of measures of peak concurrent flows. The $95^{th}$ percentile is the highest measure of the collection of measures of peak concurrent flows remaining after the top 5% of the collection of measures of peak concurrent flows is removed. This highest measure of the collection of measures of peak concurrent flows remaining can be set as a baseline flow threshold. After the baseline training period, further measures of peak concurrent flows can be acquired in successive baseline calculation intervals, and the baseline flow threshold can be updated in response to the further measures of peak concurrent flows. In other examples, other techniques can be employed to calculate the baseline flow threshold from the collection of measures of peak concurrent flows. For example, the baseline threshold policer 118 can determine a mean, an average, a maximum, or another aggregate of the collection of measures of peak concurrent flows. In other examples, instead of or in addition to basing baseline flow threshold calculations based on measurements of peak concurrent flows, a baseline flow threshold can be based on other metrics such as a measured peak flow rate, a measurement of peak embryonic flows, and so forth, within a specific zone and from a given source.

In examples where the baseline threshold policer 118 derives multiple baseline flow thresholds per zone, the baseline flow threshold derived using the $95^{th}$ percentile technique can be the lower baseline flow threshold. An upper baseline flow threshold (or multiple upper baseline flow thresholds) may be derived from the lower baseline flow threshold (e.g., set as a threshold that is 20% or another percentage greater than the lower baseline flow threshold). Alternatively, the upper baseline flow threshold can be user configurable, such as by setting the upper baseline flow threshold to a static number, a committed burst, or an excess burst.

Baseline flow thresholds for respective zones can be continually updated by the baseline threshold policer 118 over multiple baseline calculation intervals.

FURTHER EXAMPLES

Figure 4:
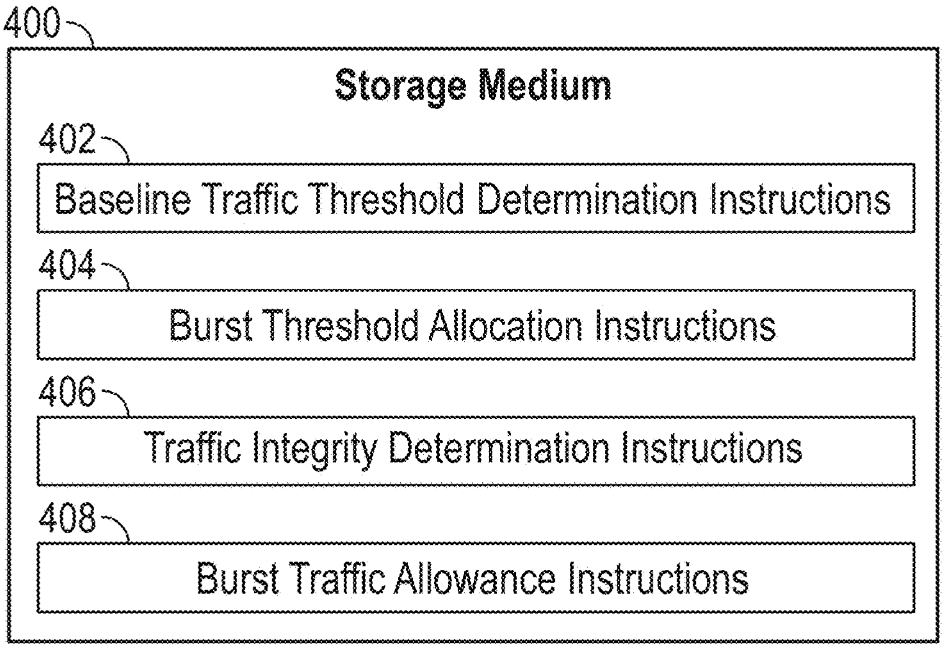
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause an adaptive protection system to perform various tasks.

The machine-readable instructions include baseline traffic threshold determination instructions 402 (which may be part of the baseline threshold policer 118 of FIG. 1) to determine, based on monitoring a traffic volume in a computing environment, a baseline traffic threshold for the computing environment. The baseline traffic threshold computed may be a baseline flow threshold that restricts a quantity of traffic flows that are allowed, or alternatively, the baseline traffic threshold can be a traffic rate threshold (that restricts a rate of traffic), a threshold that restricts a quantity of embryonic flows, or another threshold. The traffic volume monitored can be the peak concurrent flows, or peak flow rates, or peak embryonic flows discussed above. The traffic volume may be monitored within a baseline calculation interval. In some examples, the traffic volume monitored can be within a zone of the computing environment that includes multiple computing resources, and the traffic volume is from a specific source (or group of sources). Before the calculation of the baseline traffic threshold, the machine-readable instructions can collect measurements in each given zone from a specific source (or group of sources) over multiple baseline calculation intervals.

The machine-readable instructions include burst threshold allocation instructions 404 (which may be part of the smart burst allocator 116 of FIG. 1) to allocate, based on a capacity of the protection system and the baseline traffic threshold, a burst threshold to the computing environment for adding a traffic burst capacity. The burst threshold may be a burst flow threshold to allow the addition of burst traffic flows up to the burst flow threshold. Alternatively, the burst threshold may be a burst rate threshold to allow the addition of burst traffic up to the burst flow rate amount threshold, or a burst embryonic flow threshold to allow the addition of embryonic flows up to the burst embryonic flow threshold.

The machine-readable instructions include traffic integrity determination instructions 406 to determine a traffic integrity of data traffic in the computing environment based on a property of the data traffic, such as a property represented by an IoC signal.

The machine-readable instructions include burst traffic allowance instructions 408 to, based on the determined traffic integrity in the computing environment, allow additional traffic in the computing environment beyond the baseline traffic threshold up to the burst threshold. The additional traffic allowed can include a burst traffic flow or an excess burst traffic flow.

In some examples, determining the baseline flow threshold is based on a count of traffic flows in the computing environment during one or more sampling intervals, such as baseline calculation intervals.

In some examples, determining the traffic integrity includes determining that a measure of traffic integrity exceeds an integrity threshold. The allowing of the additional traffic in the computing environment beyond the baseline traffic threshold up to the burst threshold is responsive to the measure exceeding the integrity threshold, such as a threshold associated with any of the IoC signals discussed above.

In some examples, determining that the measure of traffic integrity exceeds the integrity threshold occurs at a first time. The machine-readable instructions can determine, at a second time different from the first time, that the measure of traffic integrity is less than the integrity threshold. Responsive to determining that the measure of traffic integrity determined at the second time is less than the integrity threshold, the machine-readable instructions prevent additional traffic in the computing environment beyond the baseline traffic threshold.

In some examples, the computing environment includes a plurality of zones, and the traffic volume includes traffic flows in respective zones of the plurality of zones. The baseline traffic threshold is a baseline flow threshold for a first zone of the plurality of zones, and the baseline flow threshold restricts a quantity of traffic flows that are allowed in the first zone. Also, the traffic integrity is determined for the first zone based on a property of traffic flows in the first zone. The machine-readable instructions can determine, based on monitoring the traffic flows in the respective zones, baseline flow thresholds for the respective zones, and the machine-readable instructions can allocate, based on the capacity of the protection system and the baseline flow thresholds, the burst threshold to the first zone (as well as burst thresholds to other zones). Based on the determined traffic integrity for the first zone, the machine-readable instructions allow an establishment of a quantity of traffic flows in the first zone beyond the baseline flow threshold for the first zone up to the burst threshold.

In some examples, the machine-readable instructions can determine a traffic integrity of traffic flows in the first zone during an integrity sampling interval, and based on the traffic integrity of the traffic flows in the first zone during the integrity sampling interval exceeding an integrity threshold, the machine-readable instructions can determine the baseline flow threshold for the first zone based on a count of the traffic flows in the first zone.

In some examples, the machine-readable instructions can determine a traffic integrity of traffic flows in the first zone during an integrity sampling interval, and based on the traffic integrity of the traffic flows in the first zone during the integrity sampling interval being less than an integrity threshold, the machine-readable instructions can exclude the traffic flows in the first zone from consideration in determining the baseline flow threshold for the first zone.

In some examples, the capacity of the protection system includes a flow capacity, and the machine-readable instructions can determine a reserve flow capacity of the protection system based on the flow capacity of the protection system and the baseline flow thresholds. The machine-readable instructions can compute the burst threshold for each zone based on the reserve flow capacity.

In some examples, the machine-readable instructions can allocate burst thresholds to the plurality of zones from the reserve flow capacity according to relative values of the baseline flow thresholds, such as according to Eq. 3.

In some examples, the machine-readable instructions can determine that a portion of a burst capacity of the first zone as represented by the burst threshold is unused, and the machine-readable instructions can add the portion of the burst capacity to an excess burst capacity pool (e.g., the excess burst bucket (Bucket_excess(t)) discussed above) that includes unused portions of burst capacities of the respective zones. The machine-readable instructions can allow, for a second zone of the plurality of zones, an establishment of a quantity of traffic flows in the second zone beyond a burst threshold for the second zone using an excess burst capacity of the protection system as represented by the excess burst capacity pool.

In some examples, the machine-readable instructions can allocate an excess burst capacity of the excess burst capacity pool to a burst capacity of a selected zone. In some examples, periodically, the machine-readable instructions can return unused excess burst capacities from the excess burst capacity pool to respective zones, proportionate to their contributions to the excess burst capacity pool.

Figure 5:
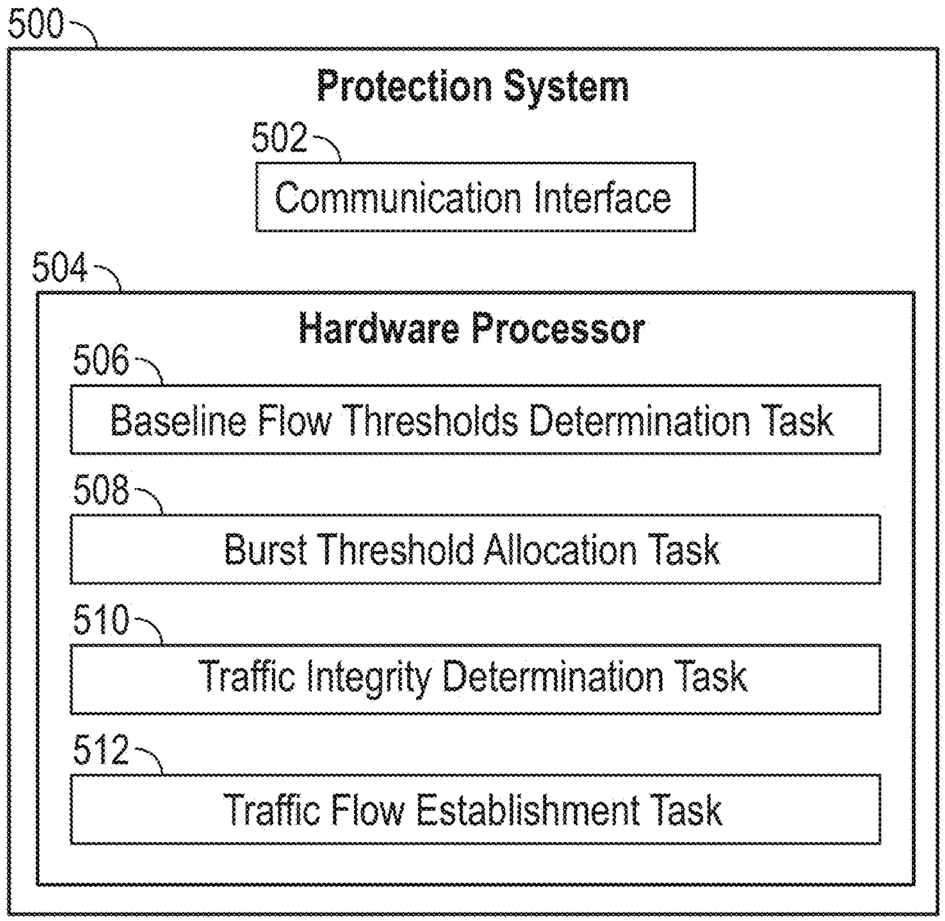
FIG. 5 is a block diagram of a protection system according to some examples.

FIG. 5 is a block diagram of a protection system 500 according to some examples. An example of the protection system 500 is the adaptive protection system 102 of FIG. 1.

The protection system 500 includes a communication interface 502 to communicate with a computing environment, such as over a network. The communication interface 502 can include a network interface controller and any protocol layers that control communications according to communication protocols.

The protection system 500 includes a hardware processor 504, or multiple hardware processors. A hardware processor can include a microprocessor, a core of a multi-core microprocessor, a microcontroller, a programmable integrated circuit, a programmable gate array, or another hardware processing circuit.

The hardware processor 504 can perform various tasks, such as due to execution of machine-readable instructions on the hardware processor 504. A hardware processor performing a task can refer to a single hardware processor performing the task or multiple hardware processors performing the task.

The tasks of the hardware processor 504 include a baseline flow thresholds determination task 506 to determine, based on monitoring traffic flows established in respective zones of a plurality of zones of the computing environment, baseline flow thresholds for the respective zones.

The tasks of the hardware processor 504 include a burst threshold allocation task 508 to allocate, based on a flow capacity of the protection system 500 and the baseline flow thresholds, a burst threshold to a first zone of the plurality of zones for adding a traffic burst capacity to the first zone.

The tasks of the hardware processor 504 include a traffic integrity determination task 510 to determine a traffic integrity in the first zone based on a property of data traffic in the first zone. The property may be represented by an IoC signal, for example.

The tasks of the hardware processor 504 include a traffic flow establishment task 512 to, based on the determined traffic integrity in the first zone, allow, for the first zone, an establishment of a quantity of traffic flows in the first zone beyond the baseline flow threshold for the first zone up to the burst threshold.

Figure 6:
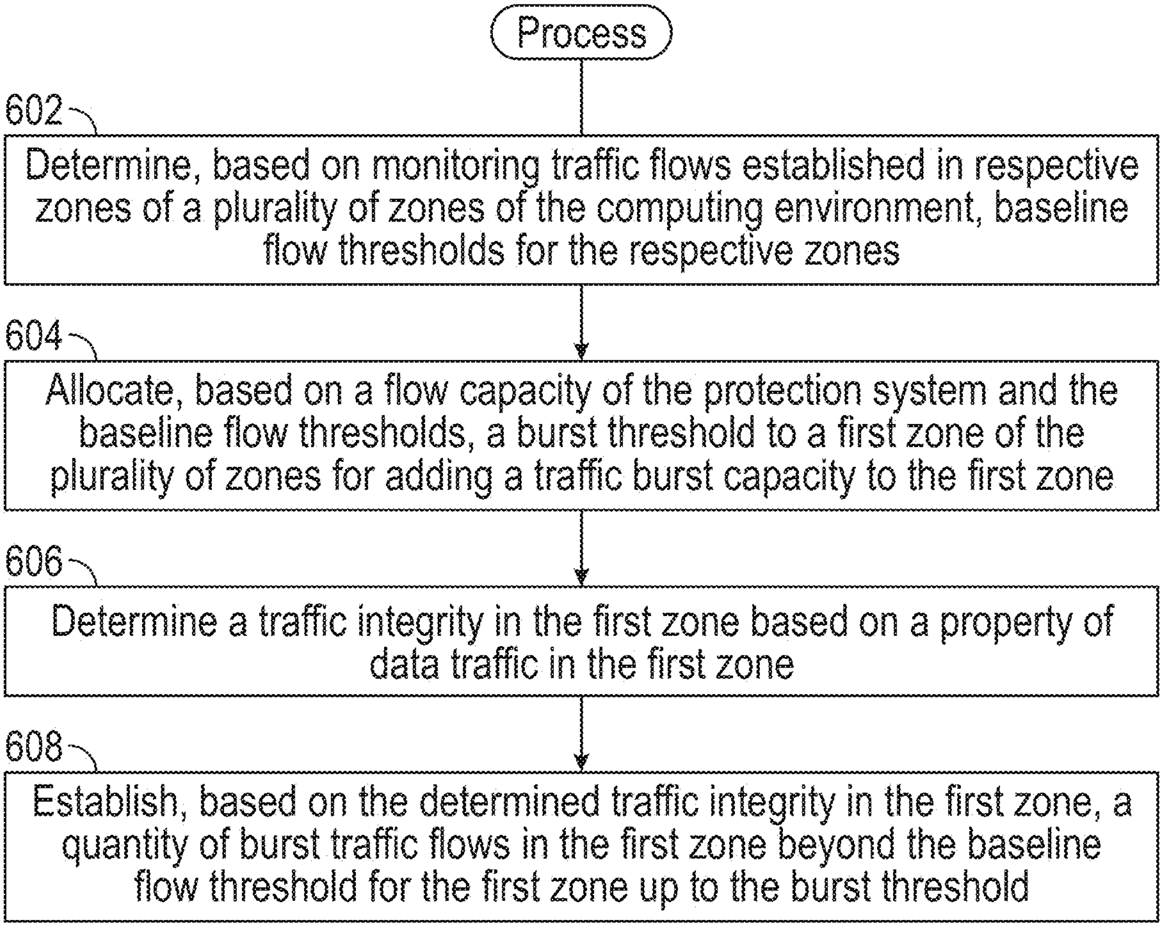
FIG. 6 is a flow diagram of a process according to some examples.

FIG. 6 is a flow diagram of a process according to some examples, which may be performed by a protection system (e.g., the adaptive protection system 102 of FIG. 1).

The process of FIG. 6 includes determining (at 602), based on monitoring traffic flows established in respective zones of a plurality of zones of the computing environment, baseline flow thresholds for the respective zones. The monitored traffic flows can include peak traffic flows in respective sampling intervals.

The process of FIG. 6 includes allocating (at 604), based on a flow capacity of the protection system and the baseline flow thresholds, a burst threshold to a first zone of the plurality of zones for adding a traffic burst capacity to the first zone. The burst threshold allocated to the first zone can be based on a reserve capacity of the protection system derived from the flow capacity of the protection system and a flow utilization based the baseline flow thresholds.

The process of FIG. 6 includes determining (at 606) a traffic integrity in the first zone based on a property of data traffic in the first zone. The process of FIG. 6 includes establishing (at 608), based on the determined traffic integrity in the first zone, a quantity of burst traffic flows in the first zone beyond the baseline flow threshold for the first zone up to the burst threshold.

A storage medium (e.g., 400 in FIG. 4) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a protection system to:

determine, based on monitoring traffic volumes established in respective zones of a plurality of zones of a computing environment, baseline traffic thresholds for the respective zones;

allocate, based on a capacity of the protection system and the baseline traffic thresholds, a burst threshold to a first zone of the plurality of zones for adding a traffic burst capacity to the first zone, wherein the protection system is to protect the computing environment against a denial of service attack;

determine a measure of traffic integrity of data traffic in the first zone based on a presence of an attack traffic in the first zone, wherein the presence of the attack traffic is based on one or more of a one-way traffic flow property, an error indication property, a packet drop count property, an alert property, a host or port scan property, or a reputation property of a network address;

responsive to determining that the measure of traffic integrity exceeds an integrity threshold, allow additional traffic in the first zone beyond the baseline traffic threshold for the first zone up to the burst threshold;

add a portion of the traffic burst capacity represented by the burst threshold for the first zone to an excess burst capacity pool that includes unused portions of traffic burst capacities of the respective zones;

allocate an excess burst capacity from the excess burst capacity pool to a second zone of the plurality of zones, the excess burst capacity exceeding a traffic burst capacity allocated to the second zone based on a burst threshold for the second zone; and allow additional traffic in the second zone beyond the burst threshold for the second zone using the excess burst capacity allocated to the second zone.

2. The non-transitory machine-readable storage medium of claim 1, wherein the traffic volumes comprise traffic flows in the respective zones, and the baseline traffic threshold for the first zone is a baseline flow threshold that restricts a quantity of traffic flows that are allowed in the first zone, and wherein allowing the additional traffic in the first zone comprises allowing an additional quantity of traffic flows in the first zone beyond the baseline flow threshold up to the burst threshold for the first zone.

3. The non-transitory machine-readable storage medium of claim 2, wherein determining the baseline flow threshold is based on a count of traffic flows in the first zone during one or more sampling intervals.

4. The non-transitory machine-readable storage medium of claim 1, wherein the determining that the measure of traffic integrity exceeds the integrity threshold occurs at a first time, and wherein the instructions upon execution cause the protection system to:

determine, at a second time different from the first time, that the measure of traffic integrity in the first zone is less than the integrity threshold; and responsive to determining that the measure of traffic integrity determined at the second time is less than the integrity threshold, prevent additional traffic in the first zone beyond the baseline traffic threshold for the first zone.

5. The non-transitory machine-readable storage medium of claim 1, wherein the capacity of the protection system represents a maximum quantity of concurrent traffic flows that the protection system is able to establish.

6. The non-transitory machine-readable storage medium of claim 2, wherein the instructions upon execution cause the protection system to:

determine a first measure of traffic integrity of traffic flows in the first zone during an integrity sampling interval; and based on the first measure of traffic integrity of the traffic flows in the first zone during the integrity sampling interval exceeding an integrity threshold, determine the baseline flow threshold for the first zone based on a count of the traffic flows in the first zone.

7. The non-transitory machine-readable storage medium of claim 2, wherein the instructions upon execution cause the protection system to:

determine a first measure of traffic integrity of traffic flows in the first zone during an integrity sampling interval; and based on the first measure of traffic integrity of the traffic flows in the first zone during the integrity sampling interval being less than an integrity threshold, exclude the traffic flows in the first zone from consideration in determining the baseline flow threshold for the first zone.

8. The non-transitory machine-readable storage medium of claim 1, wherein the capacity of the protection system comprises a flow capacity, and wherein the instructions upon execution cause the protection system to:

determine a reserve flow capacity of the protection system based on the flow capacity of the protection system and the baseline traffic thresholds; and compute the burst threshold for the first zone based on the reserve flow capacity.

9. The non-transitory machine-readable storage medium of claim 8, wherein the instructions upon execution cause the protection system to:

compute, based on the reserve flow capacity, the burst threshold for the second zone.

10. The non-transitory machine-readable storage medium of claim 1, wherein the burst threshold for the second zone is different from the burst threshold for the first zone.

11. The non-transitory machine-readable storage medium of claim 8, wherein the instructions upon execution cause the protection system to:

allocate burst thresholds to the plurality of zones from the reserve flow capacity according to relative values of the baseline traffic thresholds.

12. The non-transitory machine-readable storage medium of claim 1, wherein the instructions upon execution cause the protection system to:

add the portion of the traffic burst capacity represented by the burst threshold for the first zone to the excess burst capacity pool based on determining that the portion of the traffic burst capacity of the first zone is unused.

13. The non-transitory machine-readable storage medium of claim 1, wherein the instructions upon execution cause the protection system to:

return any unused part of the excess burst capacity pool to respective zones that contributed to the excess burst capacity pool.

14. A protection system comprising:

a communication interface to communicate with a computing environment; and a hardware processor to:

determine, based on monitoring traffic flows established in respective zones of a plurality of zones of the computing environment, baseline flow thresholds for the respective zones;

allocate, based on a flow capacity of the protection system and the baseline flow thresholds, a burst threshold to a first zone of the plurality of zones for adding a traffic burst capacity to the first zone, wherein the protection system is to protect the computing environment against a denial of service attack;

determine a measure of traffic integrity in the first zone based on a presence of an attack traffic in the first zone, wherein the presence of the attack traffic is based on one or more of a one-way traffic flow property, an error indication property, a packet drop count property, an alert property, a host or port scan property, or a reputation property of a network address;

responsive to determining that the measure of traffic integrity exceeds an integrity threshold, allow, for the first zone, an establishment of a quantity of traffic flows in the first zone beyond the baseline flow threshold for the first zone up to the burst threshold;

add a portion of the traffic burst capacity represented by the burst threshold for the first zone to an excess burst capacity pool that includes unused portions of traffic burst capacities of the respective zones;

allocate an excess burst capacity from the excess burst capacity pool to a second zone of the plurality of zones, the excess burst capacity exceeding a traffic burst capacity allocated to the second zone based on a burst threshold for the second zone; and establish a quantity of traffic flows in the second zone beyond the burst threshold for the second zone using the excess burst capacity allocated to the second zone.

15. The protection system of claim 14, wherein the hardware processor is to:

determine a first measure of traffic integrity of traffic flows in the first zone during a first sampling interval;

based on the first measure of traffic integrity of the traffic flows in the first zone during the first sampling interval exceeding an integrity threshold, determine the baseline flow threshold for the first zone based on a count of the traffic flows in the first zone during the first sampling interval;

determine a second measure of traffic integrity of traffic flows in the first zone during a second sampling interval;

based on the second measure of traffic integrity of the traffic flows in the first zone during the second sampling interval being less than the integrity threshold, exclude the traffic flows in the first zone during the second sampling interval from consideration in determining the baseline flow threshold for the first zone.

16. A method comprising:

determining, by a protection system comprising a hardware processor based on monitoring traffic flows established in respective zones of a plurality of zones of a computing environment, baseline flow thresholds for the respective zones, wherein the protection system is to protect the computing environment against a denial of service attack;

allocating, by the protection system based on a flow capacity of the protection system and the baseline flow thresholds, a burst threshold to a first zone of the plurality of zones for adding a traffic burst capacity to the first zone;

determining, by the protection system, a measure of traffic integrity in the first zone based on a presence of an attack traffic in the first zone, wherein the presence of the attack traffic is based on one or more of a one-way traffic flow property, an error indication property, a packet drop count property, an alert property, a host or port scan property, or a reputation property of a network address;

based on determining that the measure of traffic integrity exceeds an integrity threshold, establishing, by the protection system, a quantity of burst traffic flows in the first zone beyond the baseline flow threshold for the first zone up to the burst threshold;

adding, by the protection system, a portion of the traffic burst capacity represented by the burst threshold for the first zone to an excess burst capacity pool that includes unused portions of traffic burst capacities of the respective zones;

allocating, by the protection system, an excess burst capacity from the excess burst capacity pool to a second zone of the plurality of zones, the excess burst capacity exceeding a traffic burst capacity allocated to the second zone based on a burst threshold for the second zone; and establishing, by the protection system, a quantity of traffic flows in the second zone beyond the burst threshold for the second zone using the excess burst capacity allocated to the second zone.

17. The method of claim 16, comprising:

adding, by the protection system, the portion of the traffic burst capacity represented by the burst threshold for the first zone to the excess burst capacity pool based on determining that the portion of the traffic burst capacity of the first zone is unused.

18. The protection system of claim 14, wherein the determining that the measure of traffic integrity exceeds the integrity threshold occurs at a first time, and the hardware processor is to:

determine, at a second time different from the first time, that the measure of traffic integrity in the first zone is less than the integrity threshold; and responsive to determining that the measure of traffic integrity determined at the second time is less than the integrity threshold, prevent additional traffic in the first zone beyond the baseline flow threshold for the first zone.

19. The protection system of claim 14, wherein the hardware processor is to:

determine a first measure of traffic integrity of traffic flows in the first zone during an integrity sampling interval; and based on the first measure of traffic integrity of the traffic flows in the first zone during the integrity sampling interval exceeding an integrity threshold, determine the baseline flow threshold for the first zone based on a count of the traffic flows in the first zone.

20. The protection system of claim 19, wherein the hardware processor is to:

determine a second measure of traffic integrity of traffic flows in the first zone during another integrity sampling interval; and based on the second measure of traffic integrity of the traffic flows in the first zone being less than the integrity threshold, exclude the traffic flows in the first zone from consideration in determining the baseline flow threshold for the first zone.

* * * * *